June 9, 1964 RICHARD H. YEN 3,136,901
INFORMATION HANDLING APPARATUS
Filed March 1, 1962 4 Sheets-Sheet 1
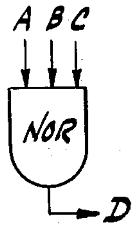
Fig. 1.
| A | B | C | D |
|---|---|---|---|
| 0 | 0 | 0 | 1 |
| 1 | 0 | 0 | 0 |
| 0 | 1 | 0 | 0 |
| 0 | 0 | 1 | 0 |
| 1 | 1 | 0 | 0 |
| 1 | 0 | 1 | 0 |
| 0 | 1 | 1 | 0 |
| 1 | 1 | 1 | 0 |
Fig. 2.
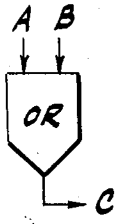
Fig. 3.
| A | B | C |
|---|---|---|
| 0 | 0 | 0 |
| 0 | 1 | 1 |
| 1 | 0 | 1 |
| 1 | 1 | 1 |
Fig. 4.
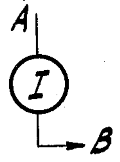
Fig. 5.
| A | B |
|---|---|
| 0 | 1 |
| 1 | 0 |
Fig. 6.
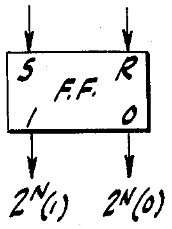
Fig. 7
| | $2^N(0)$ | $2^N(1)$ |
|---|---|---|
| R | 0 | 1 |
| S | 1 | 0 |
Fig. 8.
INVENTOR.
RICHARD H. YEN
BY John V. Regan
Attorney INVENTOR.
RICHARD H. YEN
BY John V. Regan
Attorney June 9, 1964 RICHARD H. YEN 3,136,901

INFORMATION HANDLING APPARATUS

Filed March 1, 1962 4 Sheets-Sheet 3

INVENTOR.
RICHARD H. YEN

BY John V. Regan

Attorney

June 9, 1964 RICHARD H. YEN 3,136,901
INFORMATION HANDLING APPARATUS
Filed March 1, 1962 4 Sheets-Sheet 4

INVENTOR.
RICHARD H. YEN
BY John V. Regan
Attorney

United States Patent Office 3,136,901
Patented June 9, 1964

3,136,901

INFORMATION HANDLING APPARATUS

Richard H. Yen, Haddonfield, N.J., assignor to Radio Corporation of America, a corporation of Delaware Filed Mar. 1, 1962, Ser. No. 176,738
8 Claims. (Cl. 307—88.5)

Figure 9:
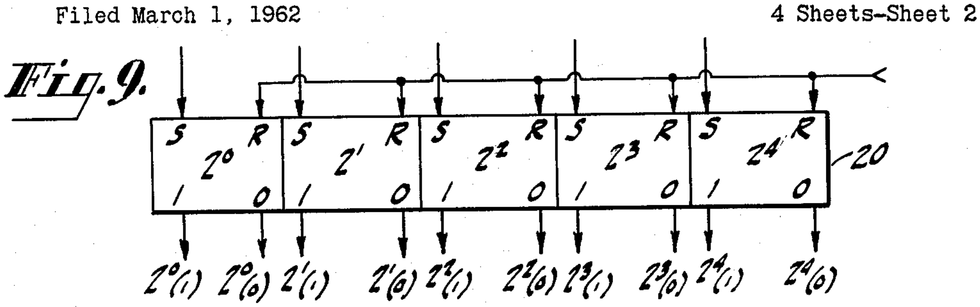

This invention relates to information handling apparatus and, in particular, to improved logic networks which may be useful either for checking the parity of a set of binary bits or for generating a parity bit.

A large percentage of the errors which occur in the operation of an information handling system can be detected at the time they occur by introducing a certain amount of redundancy into the information being handled. By this device it is possible not only to detect errors in the information itself and thus prevent subsequent operations on the erroneous information, but also to detect malfunctions in the system and provide an indication as to which portion of the system in misfunctioning.

A form of redundant coding frequently employed in digital computers, for example, is one wherein a single binary bit is carried with each binary coded character such that the total number of binary "one" bits in each character, including the single bit, is always even or, if desired, odd. This redundant code system is called parity, the single binary bit being known as a parity bit. A so-called "parity check" is made at predetermined points in the machine to check for correct parity. The present invention may be used to check for correct parity or to generate the parity bit.

Counters often are used to check parity. These devices suffer the disadvantage that they operate serially on the bits of a character and are thus slow in speed. Other checking arrangements have been suggested which operate at a higher speed, but these arrangements generally are complex and require a considerable number of circuit components.

Accordingly, it is an object of this invention to provide a simple, high speed apparatus which may be used either to check parity or to generate a parity bit.

It is another object of the invention to provide parity checking or generating apparatus in which the number of steps required is less than heretofore.

According to one embodiment of the invention for checking or generating parity there is provided means for supplying signals representing three bits and the complements thereof. Four coincidence gates each have at least three input terminals connected to receive a unique combination of three of the signals. The outputs of the coincidence gates are combined to provide an output signal which represents the logical OR function of the coincidence gate outputs.

It is one feature of the invention that the OR function is performed automatically without the need for a special gate by employing NOR gates as the coincidence gates.

Figure 10:
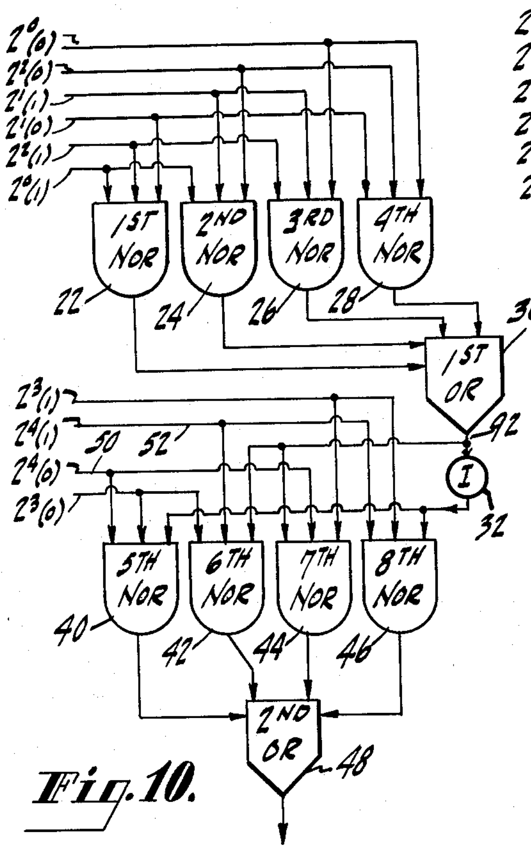
Figure 11:
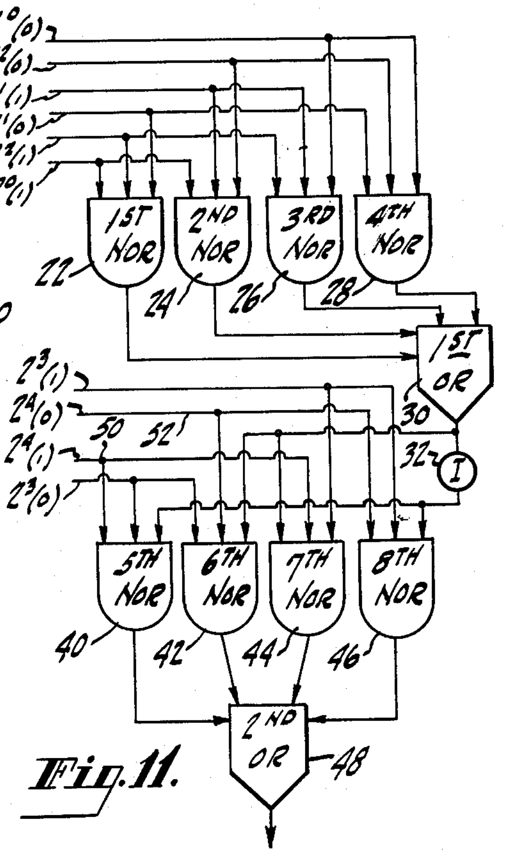
Figure 12:
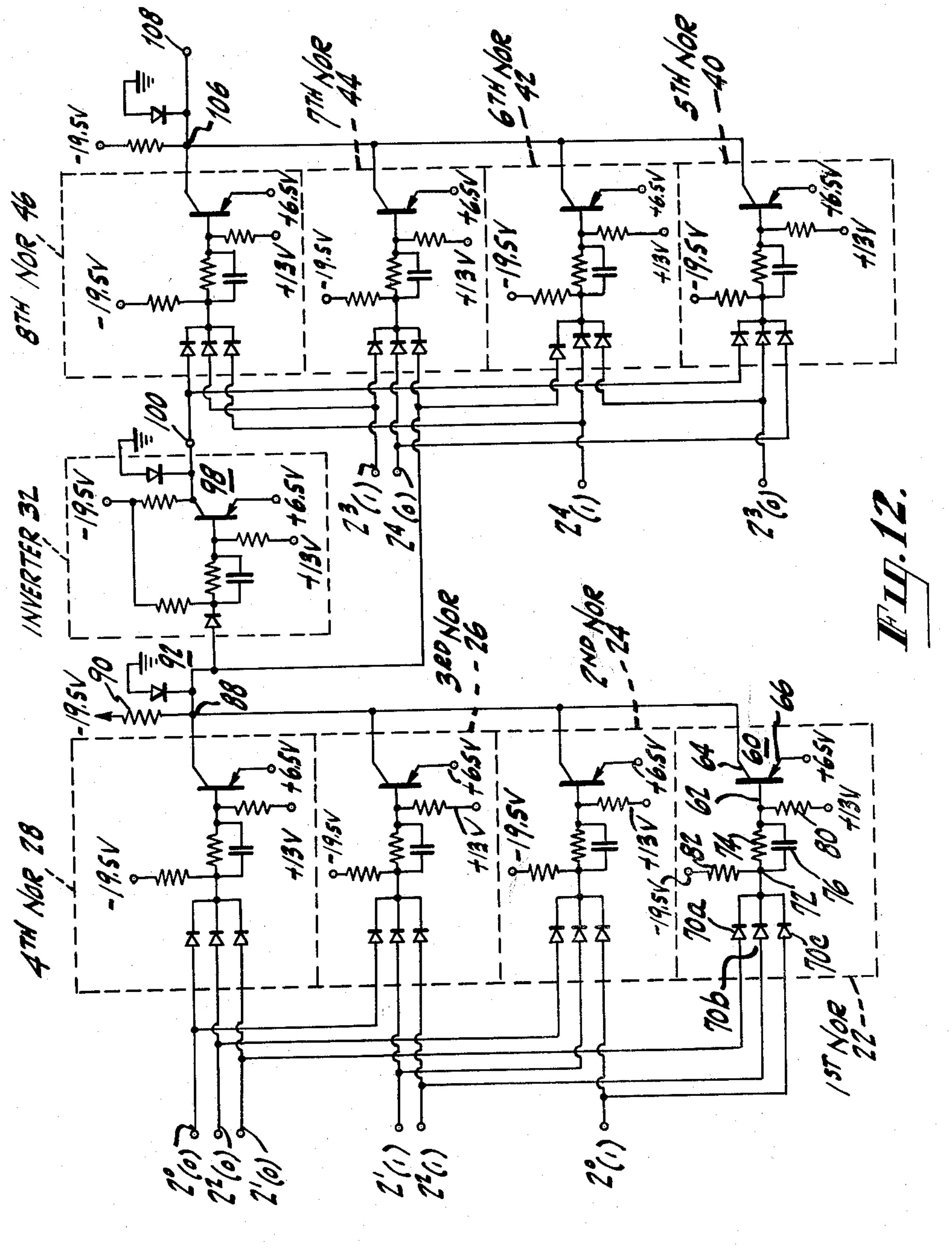
Figure 13:
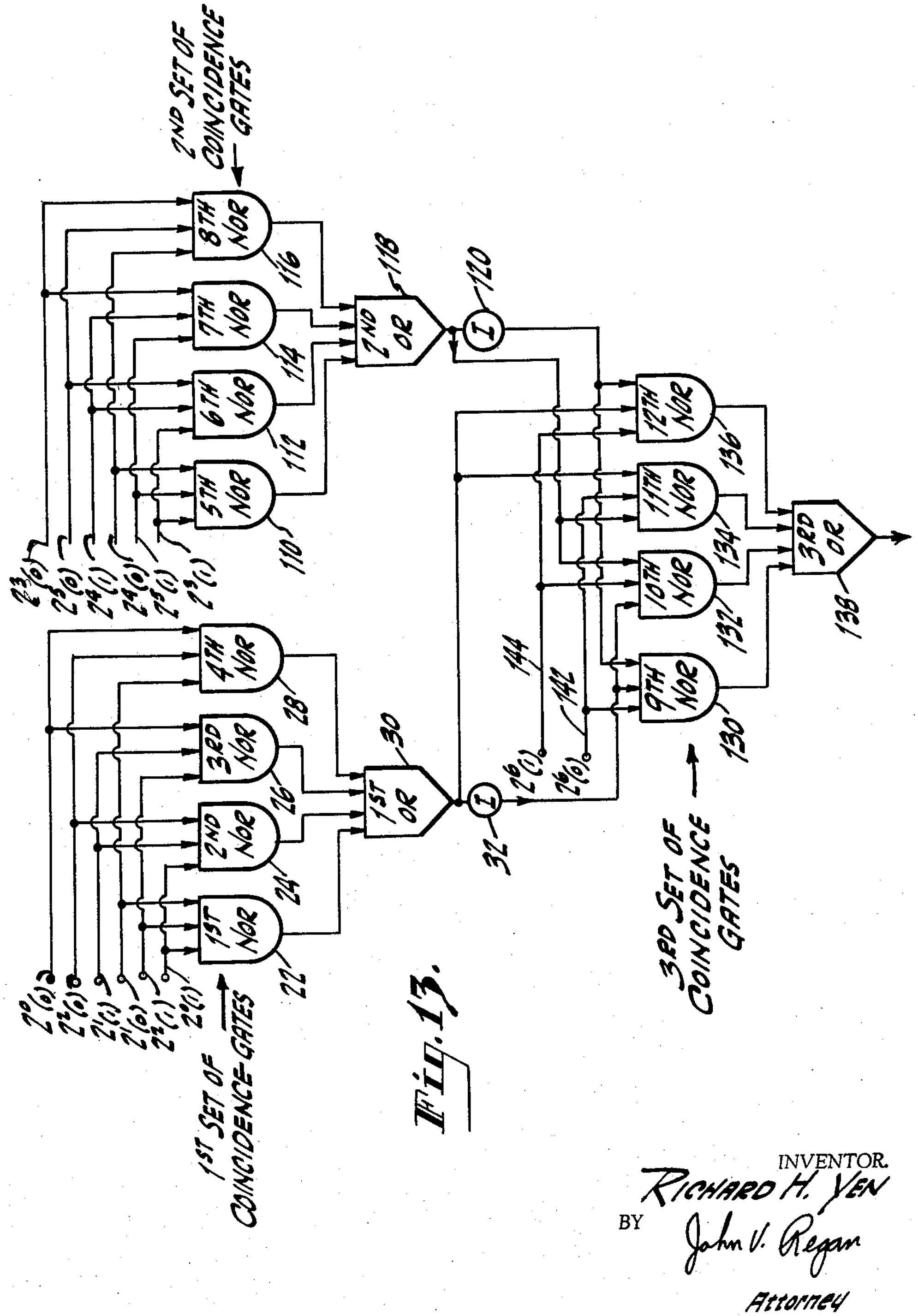

In the accompanying drawing, like reference characters refer to like components, and:

FIGURE 1 is the symbol for a NOR gate;
FIGURE 2 is a "truth" table for the NOR gate;
FIGURE 3 is the symbol for an OR gate;
FIGURE 4 is a "truth" table for the OR gate;
FIGURE 5 is the symbol for an inverter;
FIGURE 6 is a "truth" table for the inverter;

FIGURE 7 is the symbol for a flip-flop;
FIGURE 8 is a "truth" table for the flip-flop;
FIGURE 9 is a block diagram of a register;
FIGURE 10 is a block diagram of a logic network for checking the parity of a set of five bits;
FIGURE 11 is a block diagram of another logic network for checking the parity of a set of five bits;
FIGURE 12 is a schematic diagram of a preferred circuit arrangement for implementing the logic network of FIGURE 10; and
FIGURE 13 is a block diagram of a logic network for checking the parity of a set of seven bits.

The present invention will be described with particular reference to its use as a parity checker. It will be apparent, as the description proceeds, how the invention also may be used to perform the important function of parity bit generation. The code for which the present invention is used as a parity checking system is a binary code in which the electrical representations of the character bits exist simultaneously, as opposed to a serial code in which the electrical representations of the character bits occur serially in point of time. A four bit code is sufficient to represent any of the decimal digits zero through nine. Thus a five bit character, which includes the parity bit, is sufficient in a system where only the decimal digits are employed. On the other hand, many modern information handling systems employ a seven bit character which includes a six bit code and a parity bit, since all of the alphabetic characters, the decimal digits zero through nine, and additional special symbols, punctuation and the like may be represented by a six bit code. By way of illustration, therefore, but not to be construed as a limitation of the invention, apparatuses particularly suited for checking the parity of five bit characters and seven bit characters are illustrated in the drawing.

Certain symbols used in the detailed drawings of the system will now be described. FIGURE 1 is the symbol for a NOR gate, the "truth" table for which is given in FIGURE 2. A NOR gate, for present purposes, is a type of coincidence gate in which the output has a first prescribed value only when all of the inputs have a second prescribed value. In particular, the output is a signal or a level representing binary "1" only when all of the inputs are signals or levels representing binary "0." A binary "1" signal for purposes of this discussion is a high level signal, relatively speaking, and a binary "0" signal is a low level signal, relatively speaking. Thus the output of the NOR gate is high only when all of the inputs thereto are low.

FIGURE 3 is the symbol for an OR gate, the "truth" table for which is given in FIGURE 4. For present purposes, an OR gate may be defined as one having two or more inputs and a single output, characterized in that the output is high whenever one or more of the inputs is high.

FIGURE 5 is the symbol employed for an inverter. The inverter has one input and one output. The output is high when the input is low, and vice versa, as may be seen in the "truth" table of FIGURE 6.

FIGURE 7 is the symbol for a flip-flop which may be, for example, one stage of a register. The flip-flop has set (S) and reset (R) input terminals and (1) and (0) output terminals. The flip-flop ordinarily is in the reset state representing storage of a binary "0" bit. The (0) output then is low and the (1) output is high. The flip-flop may be set by applying an input signal of prescribed characteristic at the (S) input terminal. The flip-flop then changes state and the (0) output goes high and the (1) output goes low, indicating storage of a binary "1." The "truth" table for the flip-flop is given in FIGURE 8.

FIGURE 9 is a block diagram of a five stage register comprising flip-flops of the type illustrated in FIGURE 7 and described above. It is assumed that the register is a parallel input-parallel output register in which the individual flip-flop stages operate independently of one another. Signals representing a four bit code plus parity bit are applied to corresponding stages of the register 20. A stage of the register 20 is set only when a signal representing a binary "1" is applied to the (S) input terminal thereof. It is assumed that the highest order stage, labeled "$2^4$," stores the parity bit. An information handling system generally includes one or more registers of this type for staticizing signals and for the temporary storage of information. The outputs of the register 20 are supplied to other portions of the information handling system (not shown). These outputs also may be supplied as the inputs to a parity checker and the parity checker then functions to check the parity of the character stored in the register 20. The reset inputs of all of the stages are connected together, and all stages may be reset by a single input pulse.

A logic network according to the invention for checking the parity of a five bit character is illustrated in block form in FIGURE 10. The network includes a first set of four coincidence gates, illustrated as NOR gates 22 . . . 28, each having three input terminals connected to receive a unique combination of the outputs of three of the register 20 stages. Each of the inputs to a NOR gate comes from a different one of the three stages, and all of the NOR gates 22 . . . 28 receive their inputs from the same three stages. In FIGURE 10, the NOR gates 22 . . . 28 are illustrated as receiving inputs from the $2^0$, $2^1$ and $2^2$ stages, but in practice any three of the stages could be selected. The manner in which the particular input signals are selected will be described hereinafter.

The outputs of the NOR gates 22 . . . 28 are combined in a manner to provide a signal representing the logical OR function of these outputs. For example, the outputs of the NOR gates 22 . . . 28 may be applied to different inputs of a first OR gate 30. An inverter 32 is connected to receive and invert the output of the first OR gate 30.

A second set of four coincidence gates, illustrated as NOR gates 40 . . . 46, each has three inputs connected to receive a unique combination of the output signals of the remaining, or $2^3$ and $2^4$ stages of the register 20, the output of the OR gate 30 and the output of the inverter 32. The outputs of the NOR gates 40 . . . 46 are combined to provide a signal representing the logical OR function of the outputs. For example, the outputs of the NOR gates 40 . . . 46 may be applied as inputs to a second OR gate 48. The output of the second OR gate 48 has a first value when the parity of the character stored in the register 20 is even, and has a second value when the parity is odd. It is assumed that even parity is employed in the system; that is to say, the total number of binary "1's" in a character is even when the parity is correct. As will be seen hereinafter, the parity checker of FIGURE 10 is arranged so that the output of the second OR gate 48 is a signal corresponding to a binary "1" whenever the parity of the character stored in the register 20 is even. Thus, a binary "1" output from the second OR gate 48 indicates that the parity of the character is correct.

It may be desired in some instances to arrange the parity checker so that a binary "1" output signal is provided only when an error is detected in the parity. This may be accomplished by inverting the output of the second OR gate 48. Alternatively, the connections to two of the input terminals may be reversed, as in FIGURE 11, whereby the output of the second OR gate is a binary "1" signal when and only when the parity is odd. The logic network of FIGURE 11 differs from that of FIGURE 10 only with respect to the inputs to the second set of NOR gates 40 . . . 46. In FIGURE 10, the input designated $2^4(1)$ is applied to one input of each of the sixth and eighth NOR gates 42 and 46. The input signal designated $2^4(0)$ is applied to one input of each of the fifth and seventh NOR gates 40 and 44. These two inputs are reversed in the logic network of FIGURE 11. In FIGURE 11 the $2^4(0)$ signal is applied as one input to each of the sixth and eighth NOR gates 42 and 46, and the input designated $2^4(1)$ is applied as one input to each of the fifth and seventh NOR gates 40 and 44.

Operation of the parity checker of FIGURE 10 will now be described. Consider first the bits stored in the $2^0$, $2^1$ and $2^2$ stages of the register 20. Each of these bits may be either a "1" or a "0." Thus there are eight possible combinations of three bits, four of such combinations having an even number of "1's" and four combinations having an odd number of "1's" as follows:

*Table I*

| $2^0$ | $2^1$ | $2^2$ | Total "1's" |
|---|---|---|---|
| 0 | 0 | 0 | Even |
| 1 | 1 | 0 | Even |
| 1 | 0 | 1 | Even |
| 0 | 1 | 1 | Even |
| 1 | 0 | 0 | Odd |
| 0 | 1 | 0 | Odd |
| 0 | 0 | 1 | Odd |
| 1 | 1 | 1 | Odd |

The first set of NOR gates 22 . . . 28 is arranged to test for and to signal the occurrence of any of these combinations having an even number of "1's." Each of the NOR gates 22 . . . 28 recognizes a different one of these four combinations. Recall that a NOR gate, as defined previously, provides a "high" output only when all three of its inputs are low. The inputs to a NOR gate are selected so as to all be low when the combination to be recognized by that gate is present in the register 20. For example, the fourth NOR gate 28 recognizes and signals the presence of the combination (000). The $2^0$, $2^1$ and $2^2$ stages of the register 20 are all in the reset state and the $2^0(0)$, $2^1(0)$ and $2^2(0)$ outputs are all low (FIGURE 8) only when this combination is stored. These outputs therefore are selected as the inputs to the fourth NOR gate 28. The output of the fourth NOR gate 28 goes high, relatively speaking, when all of its inputs are low. The first OR gate 30 output then goes high and the output of the inverter 32 goes low.

The first NOR gate 22 recognizes and signals the presence of the (101) combination. The $2^0$ and $2^2$ stages are set and the $2^1$ stage is reset when this combination is present, and the register 20 outputs designated $2^0(1)$, $2^1(0)$ and $2^2(1)$ then are low. These outputs are applied to the three inputs of the first NOR gate 22. The outputs of the first NOR gate 22 and the first OR gate 30 go high when this combination is present, and the output of the inverter 32 goes low.

In like manner, the second and third NOR gates 24 and 26 are arranged to recognize the combinations (110) and (011), respectively, given in Table I. The output of the first OR gate 30 goes high, representing a binary "1," and the output of the inverter 32 goes low, representing a binary "0," only when the total number of "1's" in the $2^0$, $2^1$ and $2^2$ stages is even. These outputs and the outputs of the $2^3$ and $2^4$ register 20 stages are applied as inputs to the second set of NOR gates 40 . . . 46.

Consider now the bits stored in the $2^3$ and $2^4$ stages of the register 20 and the output of the first OR gate 30. Each of these bits and the output of the first OR gate 30 may be either a "1" or a "0." Thus there are eight possible combinations of "1's" and "0's," as given in Table II.

*Table II*

| OR 30 Output | $2^3$ | $2^4$ | Parity |
|---|---|---|---|
| 0 (Odd) | 0 | 0 | Odd |
| 0 (Odd) | 0 | 1 | Even |
| 0 (Odd) | 1 | 0 | Even |
| 0 (Odd) | 1 | 1 | Odd |
| 1 (Even) | 0 | 0 | Even |
| 1 (Even) | 0 | 1 | Odd |
| 1 (Even) | 1 | 0 | Odd |
| 1 (Even) | 1 | 1 | Even |

The second set of NOR gates 40 . . . 46 is arranged to recognize and to signal the occurrence of any of these combinations for which the parity of the character is even. Each of the NOR gates 40 . . . 46 recognizes a different one of the combinations which satisfy this condition. By way of example, the fifth NOR gate 40 is arranged to provide a high output only when each of the $2^3$ and $2^4$ stages of the register is storing a binary "0" and the output of the first OR gate 30 is high (indicating an even number of "1's" in the $2^0$, $2^1$ and $2^2$ stages). When this condition is present, the $2^3(0)$ and $2^4(0)$ outputs of the register are low, as is the output of the inverter 32. Thus, these outputs are supplied to the three inputs of the fifth NOR gate 40. The output of the fifth NOR gate 40 goes high, causing the second OR gate 48 output also to go high. A high output from the second OR gate 48 indicates that the parity of the character stored in the register 20 is even.

The first set of NOR gates 22 . . . 28, the first OR gate 30 and the inverter 32 of FIGURE 11 operate the same as the corresponding components of FIGURE 10, and perform the same logical function. The signals applied on two of the common input lines 50 and 52, however, are reversed from those shown in FIGURE 10. The lines 50 and 52 in FIGURE 11 are connected to the $2^4(1)$ and $2^4(0)$ outputs of the register 20 instead of the $2^4(0)$ and $2^4(1)$ outputs, respectively. The effect of this reversal is to cause the NOR gates 40 . . . 46 in FIGURE 11 to recognize only those conditions for which the total parity is odd.

It was mentioned previously that the parity checkers also could be used as parity generators. Consider the case where the bits stored in the register 20 are five information bits, that is, there is no parity bit. The outputs of the register 20 may be applied as inputs to the FIGURE 11 network as shown. The second OR gate 48 provides a high output whenever the parity of these five bits is odd. If even parity is employed in the system, this high output, representing a "1," may be fed to a bistable stage (not shown) for storing the parity bit, and this bit may be supplied to other parts of the system with the character.

The use of NOR gates as coincidence gates in the logic network provides an advantage which may not be readily apparent from the block diagrams of FIGURES 10 and 11, but which may be appreciated by a consideration of FIGURE 12, which is a schematic diagram of a preferred implementation of the FIGURE 10 logic network. The individual NOR gates are labeled in FIGURE 12 to conform with the designations employed in FIGURE 10 as an aid to reader understanding. Each of the NOR gates 22 . . . 28 and 40 . . . 46 is identical, with the exception of the particular input signals applied to the NOR gates. For this reason, only the first NOR gate 22 will be described in detail.

The first NOR gate includes a PNP transistor 60 having base 62, collector 64 and emitter 66 electrodes. The emitter electrode 66 is connected to a source of reference potential of +6.5 volts. The three input signals to the NOR gate 22 are applied at the anodes of diodes 70*a*, 70*b* and 70*c*, the cathodes of which are connected together and to a junction point 72. The parallel combination of a resistor 74 and a capacitor 76 is connected between the junction point 72 and the base electrode 62. A first biasing resistor 80 is connected between the base 62 and a source of bias potential of +13 volts. A resistor 82 is connected between junction point 72 and a source of bias potential of −19.5 volts. The various bias sources may be, for example, batteries (not shown).

It will be noted that the collector electrode 64 is connected to a junction point 88 in common with the collector electrodes of the other NOR gates 24 . . . 28 of the first set. A common collector supply resistor 90 is connected between the junction point 88 and the −19.5 volts bias source. A clamp diode 92 is connected between the junction 88 and circuit ground, and poled to clamp the voltage at the junction point 88 at approximately ground potential when the transistors in the NOR gates 22 . . . 28 are all nonconducting.

The inputs to the NOR gates 22 . . . 28, and the outputs therefrom, are at either +6.5 volts or zero volts. In accordance with the convention established previously, it is desired that a NOR gate have a high output (+6.5 volts) only when all of the inputs thereto are low (zero volts). This condition dictates that the transistor be in full conduction when the inputs thereto are all low, and be nonconducting when one or more of the inputs is high.

Consider now the operation of the first NOR gate 22, and assume that the input applied at the anode of one or more of the diodes 70*a* . . . 70*c* is high, or +6.5 volts. This input diode or diodes conducts and clamps the voltage at junction point 72 at approximately +6.5 volts, the value of the emitter 66 bias. The base 62 is more positive than +6.5 volts by an amount determined by the voltage drop across the resistor 74, and the transistor 60 then is nonconducting. Assuming that the transistors in the other NOR gates 24 . . . 28 also are nonconducting at this time, the output voltage at the collector 64 and common junction 88 is clamped at approximately ground potential by the clamp diode 92.

Consider now the condition where the inputs at the anodes of all of the input diodes 70*a* . . . 70*c* are at ground potential. The values of the resistors 74, 80 and 82 are selected so that the base 62 voltage then is less positive than +6.5 volts by an amount sufficient to bias the transistor 60 into full conduction. The capacitor 76 in the base 62 input path is provided for speed-up purposes and provides fast turn-on of the transistor 60 when all inputs thereto go low. The output voltage at the collector 64 and common junction 88 then rises to +6.5 volts minus the very small voltage drop across the collector 64-emitter 66 path of the transistor 60.

The other NOR gates 24 . . . 28 operate in a similar manner. Thus, the output voltage at the common junction 88 rises to +6.5 volts whenever the three inputs to any of the transistors in the NOR gates 22 . . . 28 are all low. By connecting all of the collectors together, the OR function is generated without the need for a separate OR gate. This results not only in a saving of components, but also in an increase in speed, since the stage delay normally present in an OR gate is eliminated.

The inverter 32 is structurally similar to the NOR gates 22 . . . 28. The only difference is that the inverter has only one input, which is connected to the common output junction 88 of the first set of NOR gates 22 . . . 28. The transistor 98 in the inverter 32 conducts when its input is low and is nonconducting when its input is high. Thus, the voltage at the inverter output 100 is approximately +6.5 volts when the input is at ground potential, and is at ground potential when the input is approximately +6.5 volts.

The output of the inverter 32, the voltage at the common junction 88, representing the OR function, and signals or levels representing the $2^3$ and $2^4$ bits and the complements thereof are applied as inputs to the second set of Nor gates 40 . . . 46. These gates 40 . . . 46 are structurally identical to the NOR gates 22 . . . 28. The inputs applied to a particular NOR gate 40 . . . 46 are selected in accordance with Table II, and its description, so that each of these gates conducts and provides a high output for a different condition of even parity. The collector electrodes are connected in common to a junction point 106, whereby the OR function is provided automatically without the need for a separate OR gate. The output at the output terminal 108 is high whenever the parity of the character being checked is even, and is low when the parity is odd.

It should be noted that the FIGURE 12 circuit employs only nine transistor circuits and three levels of logic to check the parity of a five bit character. Other known parity checkers require either a greater number of logic steps, or a greater complex of logic circuits.

FIGURE 13 is a block diagram of a logic network for indicating the parity of seven binary bits. Input signals representing the seven bits and the complements of the seven bits may be supplied from a seven stage register (not shown) of the general type illustrated in FIGURE 9. An input $2^n(0)$ is low when the bit in the $2^n$ stage is a "0" and is high when the bit is a "1." The $2^n(1)$ input has the opposite sense.

The parity indicator, which may be a parity checker or generator, includes a first set of four NOR gates 22 . . . 28, each having three inputs connected to receive a unique combination of the signals representing three of the character bits and the complements thereof. The bits of the $2^0$, $2^1$ and $2^2$ character positions are selected for purpose of illustration, although any three of the bits could be chosen. Each of the three inputs to a NOR gate is related to a different one of these bits. The outputs of the NOR gates 22 . . . 28 are combined to provide a signal representing the OR function of these outputs as, for example, by applying the outputs to a four-input, first OR gate 30. The output of the OR gate 30 is inverted by the inverter 32. The inputs are selected so that each of the NOR gates 22 . . . 28 recognizes the presence of a different one of the four combinations in which the total number of "1's" in the $2^0$, $2^1$ and $2^2$ character positions is even, and provides a high output when the combination is present. The first OR gate 30 output is high whenever the total number of "1's" in the $2^0$, $2^1$ and $2^2$ positions is even.

Input signals representing the bits of the $2^3$, $2^4$ and $2^5$ positions and the complements thereof are applied to a second set of NOR gates 110 . . . 116. Each of the three inputs to any of these gates 110 . . . 116 is related to a different one of these bits, and the inputs are selected so that each of the NOR gates 110 . . . 116 recognizes a different one of the combinations in which the total number of "1's" in the $2^3$, $2^4$ and $2^5$ positions is even. The second OR gate 118 output goes high when any of these combinations is present. An inverter 120 inverts the output of the second OR gate 118.

The outputs of the first and second OR gates 30 and 118 and the inverters 32 and 120, and signals representing the bit in the $2^6$ character position and its complement are applied to the inputs of a third set of four NOR gates 130 . . . 136. The outputs of these NOR gates 130 . . . 136 are combined to provide a signal representing the OR function as, for example, by applying these outputs to a four-input, third OR gate 138. The output of this OR gate 138 is high when the total number of "1's" in the seven bit character is even. This output can be made to go high in response to odd parity by reversing the inputs applied to input lines 142 and 144, as described previously.

The inputs to the third set of NOR gates 130 . . . 136 are selected in accordance with Table III below. Recall that the first OR gate 30 output is high, representing a binary "1" only when the number of "1's" in positions $2^0$, $2^1$ and $2^2$ is even. Also, the output of the second OR gate 118 is high only when the number of "1's" in the $2^3$, $2^4$ and $2^5$ character positions is even.

*Table III*

| Condition | OR 30 | OR 118 | $2^6$ | Parity |
|---|---|---|---|---|
| 1 | 0 | 0 | 0 | Even |
| 2 | 1 | 0 | 1 | Even |
| 3 | 1 | 1 | 0 | Even |
| 4 | 0 | 1 | 1 | Even |
| 5 | 1 | 0 | 0 | Odd |
| 6 | 0 | 1 | 0 | Odd |
| 7 | 0 | 0 | 1 | Odd |
| 8 | 1 | 1 | 1 | Odd |

The eleventh NOR gate 134 recognizes the first condition given in Table III. The outputs of the first OR gate 30 and second OR gate 118 then are low and the $2^6(0)$ input also is low when this condition is present. These signals are applied as inputs to the eleventh NOR gate 134. The output of the eleventh NOR gate 134 then goes high, as does the output of the third OR gate 138.

The tenth NOR gate 132 recognizes the second condition. The inverter 32 output, the second OR gate 118 output and the $2^6(1)$ input are low when this condition is present, and the tenth NOR gate 132 then is high. In like manner, the ninth NOR gate 130 and the twelfth NOR gate 136 recognize conditions three and four listed in Table III.

It will be understood that the FIGURE 13 arrangement may be implemented by circuits of the type illustrated in FIGURE 12 and described previously, in which case separate gates are not needed for the OR gates 30, 118 and 138. Thus, a parity for a seven bit character may be either checked or generated in three levels of logic using only twelve transistor NOR circuits and two transistor inverter circuits. Moreover, all of these circuits may be similar, thus reducing the number of spare components which are stocked.

The FIGURE 13 logic network is arranged to produce a high output at the output of the third OR gate 138 whenever the parity of the bits is even. By reversing the connections at the inputs to the lines designated 142 and 144, this same logic network produces the high output only when the parity of the bits is odd.

What is claimed is:

1. A logic circuit for indicating the parity of a set of binary bits comprising:
   means supplying input signals representing said bits and the complements of said bits, a signal representing a binary "1" having a first value and a signal representing a binary "0" having a second, different value;
   a first set of coincidence gates each having at least three input terminals connected to receive a unique combination of three of said input signals;
   means combining the outputs of said first set of coincidence gates to provide an output signal representing the logic "or" function;
   inverter means for inverting the "or" output signal;
   a second set of coincidence gates each having at least three input terminals connected to receive a unique combination of three signals from among the remaining ones of said input signals, said "or" output signal, and the inverted "or" output signal;
   and means combining the outputs of said second set of coincidence gates to provide an output signal representing the logic "or" function.

2. A logic circuit for indicating the parity of a set of binary bits comprising:
   means supplying input signals representing said bits and the complements of said bits, a signal representing a binary "1" having a first value and a signal representing a binary "0" having a second, different value;
   a first set of coincidence gates each having at least three input terminals connected to receive a unique combination of three of said input signals, each of said three input signals of a combination being related to a different one of said bits;

means combining the outputs of said first set of coincidence gates to provide an output signal representing the logic "or" function;

inverter means for inverting the "or" output signal;

a second set of coincidence gates each having at least three input terminals connected to receive a unique combination of three signals from among the remaining ones of said input signals, said "or" output signal, and the inverted "or" output signal;

and means combining the outputs of said second set of coincidence gates to provide an output signal representing the logic "or" function.

3. A logic circuit for indicating the parity of a set of binary bits comprising:

means supplying input signals representing said bits and the complements of said bits, a signal representing a binary "1" having a first value and a signal representing a binary "0" having a second, different value;

a first set of coincidence gates each having at least three input terminals connected to receive a unique combination of three of said input signals, each of said three input signals of a combination being related to a different one of said bits, and each of the coincidence gates receiving input signals related to the same ones of said bits;

means combining the outputs of said first set of coincidence gates to provide an output signal representing the logic "or" function;

inverter means for inverting the "or" output signal;

a second set of coincidence gates each having at least three input terminals connected to receive a unique combination of three signals from among the remaining ones of said input signals, said "or" output signal, and the inverted "or" output signal;

and means combining the outputs of said second set of coincidence gates to provide an output signal representing the logic "or" function.

4. A logic circuit for indicating the parity of a set of binary bits comprising:

means supplying input signals representing said bits and the complements of said bits, a signal representing a binary "1" having a first value and a signal representing a binary "0" having a second, different value;

a first set of coincidence gates each having at least three input terminals connected to receive a unique combination of three of said input signals;

a first "or" gate connected to receive the outputs of said first set of coincidence gates;

an inverter connected to receive the output of said "or" gate;

a second set of coincidence gates each having at least three input terminals connected to receive a unique combination of three signals from among the remaining ones of said input signals, the output of said first "or" gate, and the output of said inverter;

and a second "or" gate connected to receive the outputs of said second set of coincidence gates.

5. A logic circuit for indicating the parity of a set of binary bits comprising:

means supplying signals representing each of said bits and the complements thereof, a signal representing a binary "1" having a first value and a signal representing a binary "0" having a second value;

a first set of four coincidence gates each having at least three input terminals connected to receive a unique combination of three of said input signals;

means combining the outputs of said first set of coincidence gates to provide an output signal representing the logic "or" function;

inverter means for inverting the "or" output signal;

a second set of four coincidence gates each having at least three input terminals connected to receive a unique combination of three signals from among said "or" output signal, said inverter means, and the said input signals applied to said first set of coincidence gates;

and means for combining the outputs of said second set of coincidence gates and providing an output signal representing the logic "or" function of the second set of coincidence gates output signals.

6. A logic circuit for indicating the parity of a set of five binary bits comprising:

means supplying input signals representing said five bits and the complements thereof;

a first set of four coincidence gates each having three input terminals connected to receive a unique combination of three of said input signals, each of the three input signals of each said combination being related to a different one of a first group of three of said bits;

means combining the outputs of said first set of coincidence gates to provide an output signal representing the logic "or" function;

inverter means for inverting the "or" output signal;

a second set of four coincidence gates each having at least three input terminals connected to receive a unique combination of three signals from among the input signals related to the remaining two of said bits, said "or" output signal, and the output of said inverter means;

and means combining the outputs of said second set of coincidence gates to provide an output signal representing the logic "or" function, the latter output signal being indicative of the parity of said five bits.

7. A logic circuit for indicating the parity of a set of binary bits comprising:

means supplying input signals representing said bits and the complements thereof;

a first set of coincidence gates each having at least three input terminals connected to receive a unique combination of signals from among a first group of said input signals;

means combining the outputs of said first set of coincidence gates to provide a first signal representing the logic "or" function;

first inverter means for inverting the said first signal;

a second set of coincidence gates each having at least three input terminals connected to receive a unique combination of signals from among a first set of said input signals;

means combining the outputs of said second set of coincidence gates and providing a second signal representing the logic "or" function;

second inverter means for inverting said second signal; a third set of coincidence gates each having at least three input terminals connected to receive a unique combination of three signals from among the remaining ones of said input signals, said first signal, said second signal, and the outputs of said first and second inverter means;

and means for combining the outputs of said third set of input gates to provide an output signal representing the logic "or" function of the outputs of said third set of coincidence gates.

8. A logic network for indicating the parity of a set of binary bits comprising:

means supplying input signals representing said binary bits and their complements;

a first set of four coincidence gates each having three input terminals connected to receive a unique combination of three of said signals, each of said three signals applied to a gate being related to a different one of said bits and each of said first set of gates receiving signals related to the same ones of said bits;

each of said first set of gates including an amplifying device having a control electrode connected to the corresponding said three input terminals, an output electrode and an input electrode;
means connecting each said output electrode together;
an inverter having its input connected to each said output electrode;
a second set of coincidence gates similar to said first set;
and means applying to each of said second set of gates a unique combination of three inputs from among remaining ones of said supplied input signals, the output of said first set, and the output of said inverter.

References Cited in the file of this patent

UNITED STATES PATENTS

| | | |
|---|---|---|
| 2,939,967 | Redpath et al. | June 7, 1960 |
| 3,075,093 | Boyle | Jan. 22, 1963 |
| 3,078,376 | Lewin | Feb. 19, 1963 |

OTHER REFERENCES

"The Elliot Sheffen Stroke Static Switching System," Electronic Engineering, Kellett, September 1960, pages 534–539.

"Multi-Input Exclusion OR Circuit," IBM Technical Disclosure Bulletin, Galluppi, vol. 1, No. 2, August 1958.